United States Patent
Kabbara et al.

(10) Patent No.: US 8,205,102 B2
(45) Date of Patent: Jun. 19, 2012

(54) INTELLIGENT POWER MANAGEMENT OF AN INTERMEDIATE NETWORK DEVICE SWITCHING CIRCUITRY AND POE DELIVERY

(75) Inventors: Hazem Kabbara, Boylston, MA (US); James S. Hiscock, Rockport, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 655 days.

(21) Appl. No.: 12/348,697

(22) Filed: Jan. 5, 2009

(65) Prior Publication Data
US 2010/0171602 A1    Jul. 8, 2010

(51) Int. Cl.
*G06F 1/00* (2006.01)
*G06F 1/26* (2006.01)
*G06F 15/177* (2006.01)

(52) U.S. Cl. .......................................... 713/300; 713/1
(58) Field of Classification Search .................. 713/300, 713/1
See application file for complete search history.

(56) References Cited

U.S. PATENT DOCUMENTS

| | | | |
|---|---|---|---|
| 5,483,656 A * | 1/1996 | Oprescu et al. | 713/320 |
| 7,155,622 B2 | 12/2006 | Mancey et al. | |
| 7,512,817 B2 * | 3/2009 | Mantver | 713/300 |
| 7,577,859 B2 * | 8/2009 | Bilak | 713/320 |
| 2004/0230846 A1 * | 11/2004 | Mancey et al. | 713/300 |
| 2005/0125507 A1 * | 6/2005 | Atias et al. | 709/220 |
| 2005/0262364 A1 * | 11/2005 | Diab et al. | 713/300 |
| 2006/0053324 A1 * | 3/2006 | Giat et al. | 713/300 |
| 2007/0110360 A1 * | 5/2007 | Stanford | 385/14 |
| 2007/0278857 A1 * | 12/2007 | Robbins | 307/2 |
| 2008/0114997 A1 * | 5/2008 | Chin | 713/321 |
| 2009/0100275 A1 * | 4/2009 | Chang et al. | 713/300 |
| 2009/0172421 A1 * | 7/2009 | Schindler | 713/300 |
| 2009/0327766 A1 * | 12/2009 | Ghoshal et al. | 713/300 |

* cited by examiner

*Primary Examiner* — Mark Connolly (57) ABSTRACT

Embodiments of the invention include a management agent which has access to power output control circuitry of a digital electronic communication switch, a power meter, a load sharing means, and the ability to manage the power of switching circuits in the switch. The power meter enables the management agent to identify the power consumed by the switching circuits that are enabled and operational. This information, coupled with (1) knowledge of the power allocated to each port via PoE, and (2) policy information (which specifies power allocation preferences) is used in a two-pass power management method.

34 Claims, 6 Drawing Sheets

INTELLIGENT POWER MANAGEMENT OF AN INTERMEDIATE NETWORK DEVICE SWITCHING CIRCUITRY AND POE DELIVERY

BACKGROUND

Electronic communication switches have unpredictable power requirements, due in part to the widely varying and unpredictable communication loads and Power over Ethernet (PoE) loads they are called upon to handle. This, in combination with a movement towards energy efficiency, is creating a need for new methods for managing power in network switches.

A variety of existing techniques are used to manage power in network switches. For example, in modular switches, which consist of a set of switching modules operating in cooperation with each other, the power supplied to each of the switching modules is managed to assure that: (1) the total power supplied to the switching modules is not greater than the capacity of the installed power supplies; and (2) to maintain enough power head room to handle a power supply going down without affecting the switching modules' operation. As another example, switch ASIC vendors offer switching ASICs that can power down portions of the switching circuitry to save power.

As yet another example, stackable switches have PoE power management, which enables the switch to provide power to connected devices over Ethernet connections. Such switches do not, however, have the ability to dynamically re-allocate power between internal switch circuitry and power provided to external devices via PoE.

There is a catch-22 problem managing power allocation between switch port operation and PoE power delivery. If one were to first measure the power used by the switching circuitry to estimate the amount of power the circuitry will need, the estimate will be low because the circuitry is in an idle state and therefore not consuming as much power as when it is passing data in an active state. If one were then to allocate PoE power based on this low estimate and then turn on the external devices, the devices would begin to transmit data, thereby activating the switching circuitry, which would not receive sufficient power. On the other hand, if one first tries to allocate all the PoE power requested, insufficient power may be reserved for the switching circuitry. To avoid such problems, existing switches typically supply the maximum (worst-case) power to the switching circuitry and to PoE at all times.

SUMMARY

Embodiments of the invention include a management agent which has access to power output control circuitry of a digital electronic communication switch, a power meter, a load sharing means, and the ability to manage the power of switching circuits in the switch. The power meter enables the management agent to identify the power consumed by the switching circuits that are enabled and operational. This information, coupled with (1) knowledge of the power allocated to each port via PoE, and (2) policy information (which specifies power allocation preferences) is used in a two-pass power management method.

The first pass initializes the system by supplying power to the switching circuitry and, via PoE, to other devices over the attached Ethernet cables based on port priority and other secondary parameters when needed. The second pass monitors actual power consumed by both the switching circuitry and external devices, and learns more about what is connected to each of the switch ports to better tune the applied priorities. Since some priorities are based on what is connected to the port, the type of device connected to the port (or where in the network topology the port is located) can be ascertained by inspecting network traffic transmitted by the device or via communication packets inquiring information from the attached devices. As a result of the actual power measurements and the better understanding of the connected device types, a second power allocation is made. The power management agent continues to monitor network traffic and/or to send communications to attached devices to keep abreast of the attached network types, operational status, and possibly changing power needs.

More specifically, one embodiment of the present invention is directed to a method for power management in a network switch having a plurality of switching circuits and at least one port. The method comprises: (A) selecting an allocation of power to the plurality of switching circuits and the at least one port, comprising: (A)(1) measuring a first amount of power consumed in aggregate by the plurality of switching circuits; (A)(2) identifying a second amount of power consumed in aggregate by the at least one port via Power over Ethernet (PoE); and (A)(3) selecting the first allocation based on the first amount of power and the second amount of power.

Another embodiment of the present invention is directed to a power management agent for use with a network switch, the network switch having a plurality of switching circuits and at least one port. The power management agent comprises: means for receiving a first signal representing a first amount of power consumed in aggregate by the plurality of switching circuits; means for receiving a second signal identifying a second amount of power consumed in aggregate by the at least one port via Power over Ethernet (PoE); and; means for selecting a first allocation of power to the plurality of switching circuits and the at least one port based on the first amount of power and the second amount of power.

A further embodiment of the present invention is directed to a network switch comprising: a plurality of switching circuits; at least one port; a power management agent; load sharing means; and a power meter. The power meter comprises: means for measuring a first amount of power consumed in aggregate by the plurality of switching circuits; means for transmitting a signal representing the first amount of power to the load sharing means; means for identifying a second amount of power consumed in aggregate by the at least one port via Power over Ethernet (PoE); and means for transmitting a signal representing the second amount of power to the load sharing means. The load sharing means comprises: means for selecting a first allocation of power to the plurality of switching circuits and the at least one port based on the first amount of power and the second amount of power; and means for transmitting a signal representing the first allocation of power to the power management agent. The power management agent comprises power output control circuitry for allocating power to the plurality of switching circuits and the at least one port in accordance with the first allocation.

Yet another embodiment of the present invention is directed to a method for power management in a network switch having a plurality of switching circuits and at least one port. The method comprises: (A) selecting a first allocation of power to the plurality of switching circuits and the at least one port; (B) selecting a second allocation of power to the plurality of switching circuits and at least one port, comprising: (B)(1) measuring a first amount of power consumed in aggregate by the plurality of switching circuits; (B)(2) measuring a second amount of power consumed in aggregate by the at least one port via Power over Ethernet (PoE); (B)(3) identifying characteristics of at least one device connected to the at least one port; (B)(4) modifying, based on the identified device characteristics, at least one power management policy for allocating power among the at least one port to produce at least one modified power management policy; and (B)(5) selecting the second allocation of power based on the first amount of power, the second amount of power, the identified device characteristics, and the at least one modified power management policy.

Yet a further embodiment of the present invention is directed to a power management agent for use with a network switch. The network switch includes a plurality of switching circuits and at least one port. The power management agent comprises: internal power identification means for identifying an amount of power available from an internal power supply of the switch; internal power provision means for providing power to the at least one port using power from the internal power supply if the amount of power available is at least as great as the aggregate amount of power required to be provided to the at least one port; and external power provision means. The external power provision means comprises means for performing the following functions if the amount of power available is less than the aggregate amount of power required to be provided to the at least one port: requesting power from at least one device connected to the at least one port; receiving power from the at least one device; and providing power to the at least one port using power from the internal power supply and the received power.

Another embodiment of the present invention is directed to a system comprising: a network switch and a first device connected to the switch over a network connection at a port of the network switch. The network switch comprises means for providing power via PoE to the first device while no data is being sent to or received from the first device over the network connection.

Yet another embodiment of the present invention is directed to a network switch comprising: a port comprising means for coupling the port to a first device over a network connection; and means for providing power via PoE to the first device while no data is being sent to or received from the first device over the network connection.

A further embodiment of the present invention is directed to a device comprising: a port comprising means for coupling the port to a network switch over a network connection; and means for receiving power via PoE from the network switch over the network connection while no data is being sent to or received from the device over the network connection.

Another embodiment of the present invention is directed to a network cable comprising: means for connecting the cable to a device; means for transmitting data to and receiving data from the device according to a network protocol over a network connection; and means for requesting power over the network connection on behalf of the device.

Other features and advantages of various aspects and embodiments of the present invention will become apparent from the following description and from the claims.

DETAILED DESCRIPTION

Embodiments of the present invention provide improved power management in digital electronic network switches. For example, if there is insufficient power available to the switch to satisfy all power requests made to the switch, or there is a desire to limit the power provided by the switch, embodiments of the present invention may adjust the amount of power provided both to the switch's internal circuitry and to external devices connected to the switch. The power adjustment may be made based on a combination of information about the devices connected to the switch's ports, the amount of power allocated to each port via PoE, and policy information that specifies power allocation preferences.

In certain embodiments of the present invention, the general power management method summarized above is performed in two passes. The first pass initializes the system by supplying power to the switching circuitry, and via PoE, to other devices over the attached Ethernet cables based on port priority and other secondary parameters when needed. The second pass monitors actual power consumption and learns more about what is connected to each of the switch ports to better tune the applied priorities. As a result of the actual power measurements and the better understanding of the connected device types, a second power allocation is made. The power management agent continues to monitor network traffic and/or to send communications to attached devices to keep abreast of the attached network types, operational status, and possibly changing power needs.

Figure 1A:
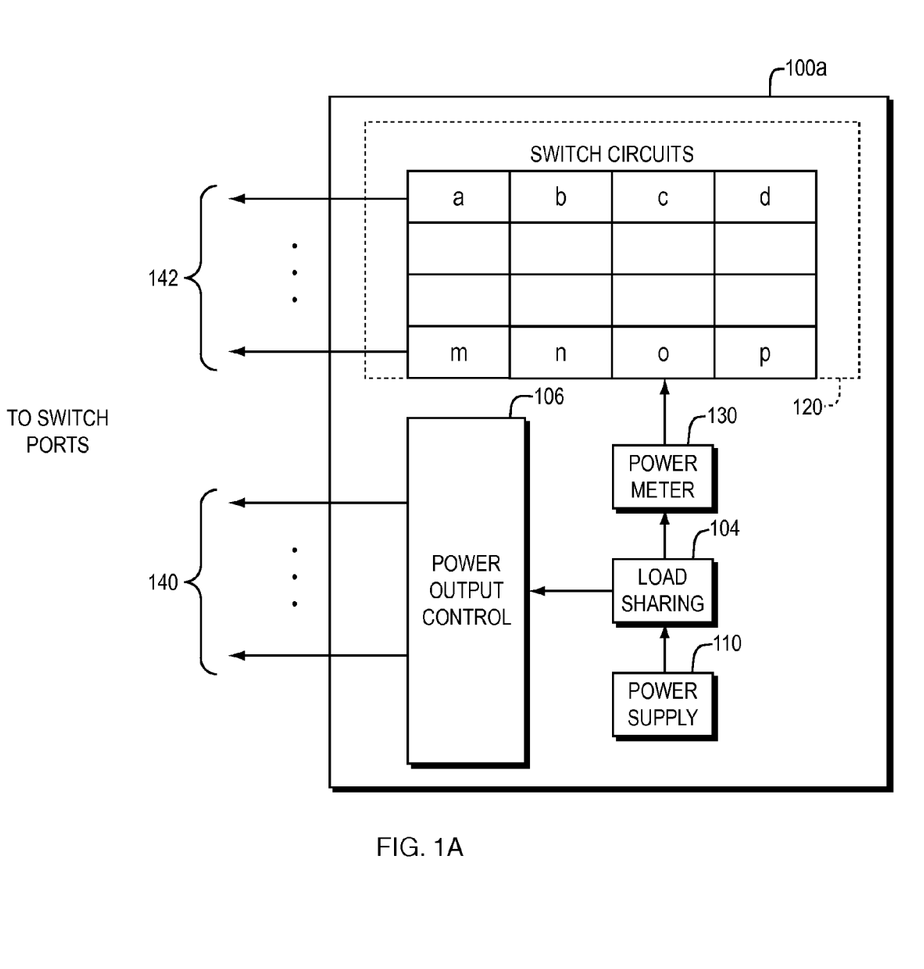
FIG. 1A is a block diagram of a switch according to one embodiment of the present invention.

Referring to FIG. 1A, a switch 100a is shown in which the power to be managed comes solely from an integral power supply 110. The switch 100a also includes a plurality of switching circuits 120. For purposes of example, sixteen switching circuits 120a-p are shown. The switch 100a may, however, include any number of switching circuits. The switch circuits 120 may include PHYs, MACs, and packet switching components. Conductors 142, which connect the switch circuits 120 to the ports (not shown) of the switch 100a through a center tap isolation transformer (not shown), carry data between the switch circuits 120 and the switch ports.

The switch 100a also includes a power management agent (not shown in FIGS. 1A and 1B, but shown in FIG. 2) having access to power output control 106, power meter 130, load sharing circuitry 104, and the power management modules (not shown) of the switching circuits 120. Power output control 106 transmits PoE power over conductors 140 to the center tap of the same center tap transformer that is connected to conductors 142, as indicated, for example, by IEEE standard 802.3af or 802.3at. The switching circuit power management modules can read the status of the switching ports 120a-120p and set operational parameters of the switching ports 120a-120p. The power meter 130 measures the amount of power consumed by the switching circuits 120, based upon which switching circuits 120a-120p are enabled and operational.

The power meter 130 transmits a signal representing the power measurement to the power management agent. The power management agent uses this power measurement information, coupled with the knowledge of the amount of power allocated to each of the ports via PoE, and power management policy information that specifies power allocation preferences, to manage the amount of power allocated to the switching circuits 120 and to the switching ports. The power management agent may perform such management in two passes.

Figure 1B:
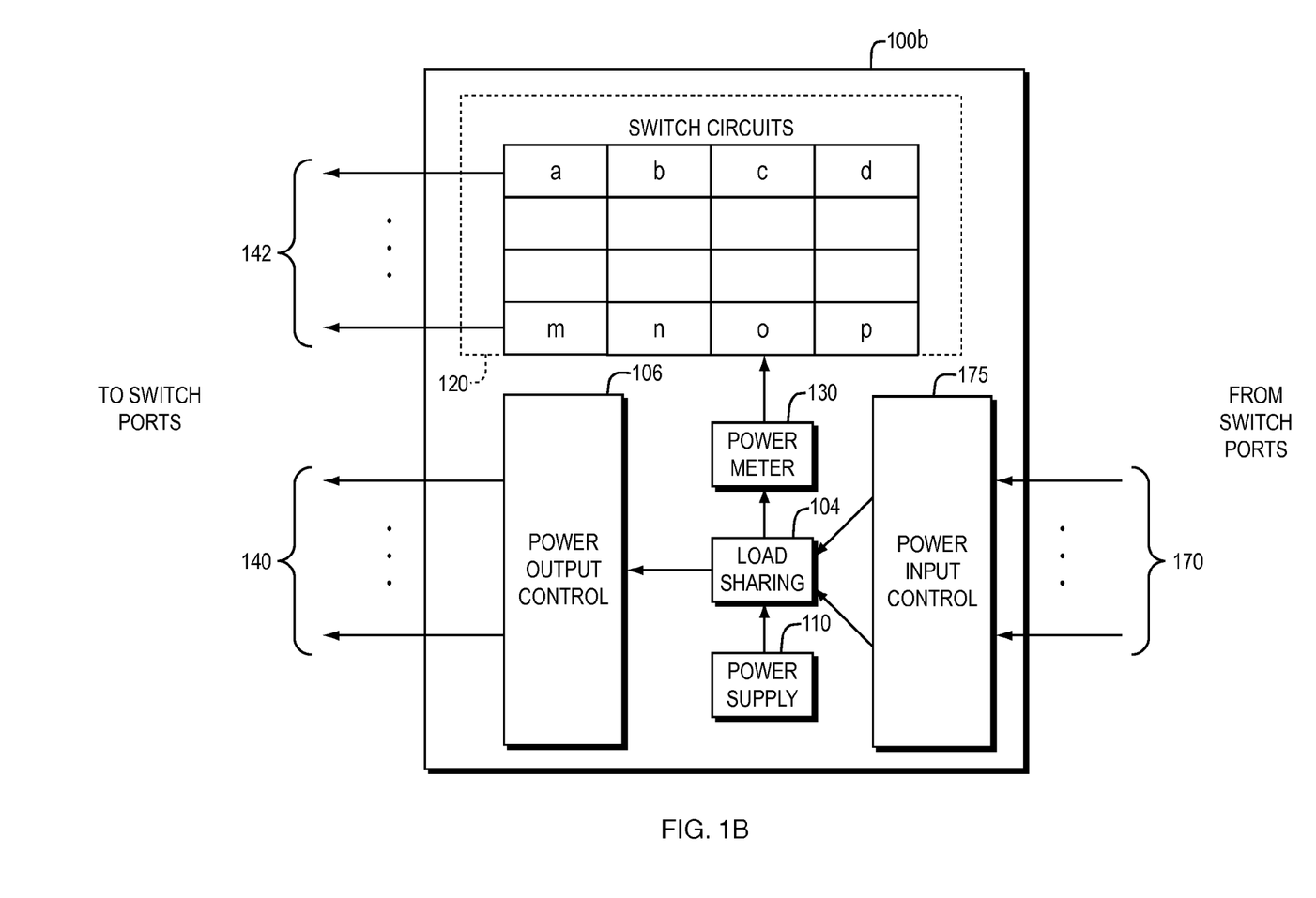
FIG. 1B is a block diagram of a switch according to another embodiment of the present invention.

Referring to FIG. 1B, a switch 100b is shown in which the power to be managed comes from both the integral power supply 110 and from power supplied by other attached devices (not shown) at network connections via conductors 170 to a power input control 175. (Note that conductors 170 and 140 may be contained within the same Ethernet cable.) The switch 100b includes a power management agent (not shown in FIGS. 1A and 1B, but shown in FIG. 2) having access to power input control 175. The power meter 130 measures the amount of power consumed by the switching circuits 120, based upon which switching circuits 120a-120p are enabled and operational.

The power meter 130 transmits a signal representing the power measurement to the power management agent. The power management agent uses this power measurement information, coupled with the knowledge of the amount of power allocated to each of the ports via PoE, and policy information that specifies power allocation preferences, to manage the amount of power allocated from the integral power supply 110 to the switching circuits 120 and to the switching ports.

If, however, there is insufficient power from the integral power supply 110 to supply all the power requests received from the external devices over connections 170, then the power management agent may request power from one or more of the external attached devices. The power management agent may, for example, transmit such requests as messages sent using Ethernet packets or via signals sent along the Ethernet cable, for example by using methods in compliance with IEEE standards 802.3af or 802.3at. If power is granted from the attached devices, then the power management agent supplies additional power, received from the attached devices, to the load sharing circuitry 104 via the power input control circuitry 175.

Figure 2:
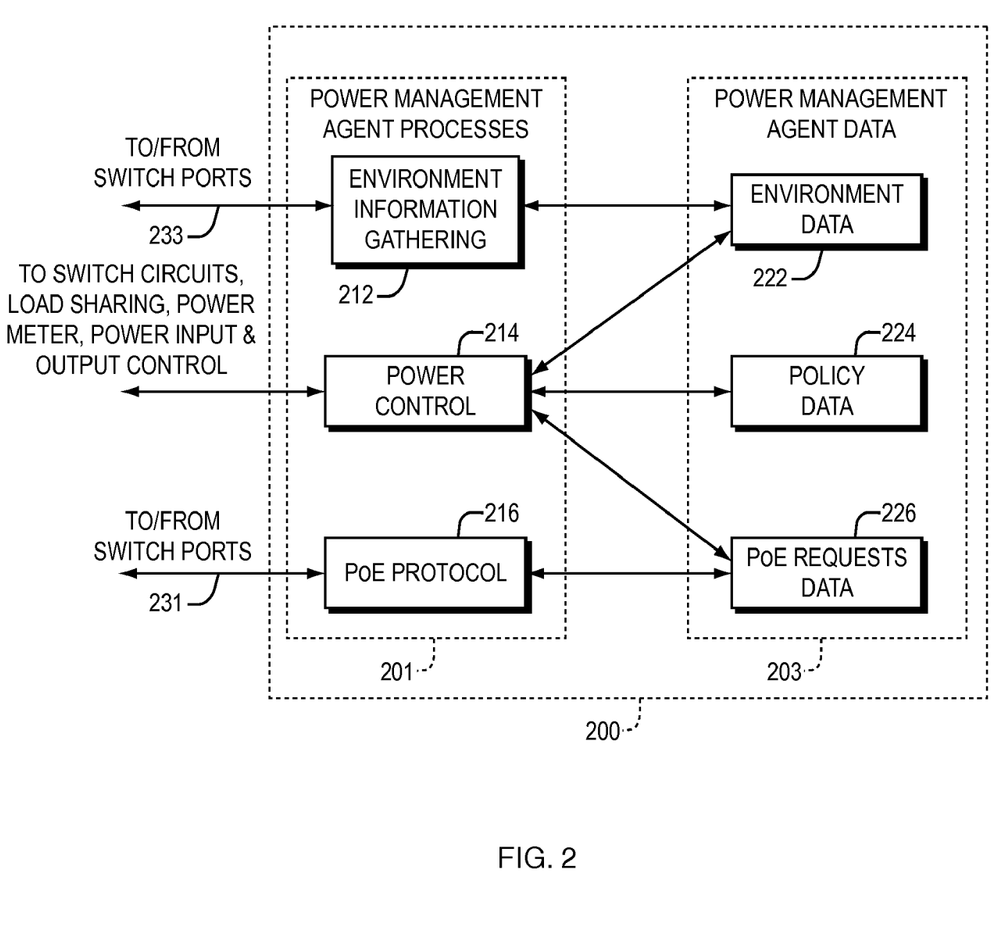
FIG. 2 is a block diagram of a power management agent according to one embodiment of the present invention.

Referring to FIG. 2, a power management agent 200 is shown according to one embodiment of the present invention. The power management agent 200 includes power management agent processes 201 and power management agent data 203. The power management agent processes 201 perform tasks that manage power to the switch circuits 120, power supplied to attached devices over conductors 140, and optionally power received from attached devices through the network connections via conductors 170. The power management data 203 is used by the power management agent processes 201. Environment data 222 stores information about the devices connected to the switch ports and network topology information that relates to each of the switch ports. PoE Request data 226 contains information about the power requested by and granted over conductors 140 and 170 to devices attached to ports and, optionally, power requested from and supplied from those attached devices. Power policy data 224 contains power allocation policy information. Power policy data 224 includes parameters, such as Port Importance (PI), which can be set by management and can be adjusted by the power control process 214 based on environment data 222. This and other parameters in the policy data 224 are used by the power control process 214 to aide in power allocation decisions.

The environment information gathering process 212 sends and receives messages over conductors 142 using Ethernet packets to gather information about the devices connected to the switch's ports and network topology information that relates to each of the switch ports. The environment information gathering process 212 gathers environment information by snooping on packets received by the switch 100a or 100b from attached devices, communicating with attached devices, and by reading topology information stored by another agent elsewhere in the network. Topology information may also be gathered from an agent (not shown) that is co-resident in the switch 100a or 100b.

The PoE protocol agent 216 receives power requests from, and optionally send power requests to, attached devices connected to the switch's ports. Power requests may come from messages sent using Ethernet packets or via signals sent along the Ethernet cable, for example using methods compliant with IEEE standards 802.3af or 802.3at. The PoE protocol agent 216 records the amount of power requested by each port in the PoE requests data 226. If power is needed from attached devices connected via conductors 170, then the power control process 214 specifies the power it needs, in response to which the PoE Protocol process 216 issues power requests through the network connections via conductors 170 to devices connected to the switch ports in an attempt to meet the stated power need. The power control process 214 may specify the port or ports on which it prefers to receive the requested power, or it can simply state the amount of power request and allow the PoE protocol process 216 to obtain the requested power from any attached device(s) connected through the network connections via conductors 170. The PoE protocol process 214 then records all power received and allocated on a per switch port basis in the PoE requests data 226.

The power control process 214 uses a two pass power management method to allocate the power supplied by the integral power supply 110. The first pass makes a first power allocation by supplying power to the switch circuits 120 and, via PoE, to other devices through the network connections via conductors 140 based on the policy data 224, such as port priority (importance). The second pass monitors, over the network connections via conductors 140, actual power consumption and learns more about which devices are connected to each of the switch ports to better tune the applied port priorities (stored in the policy data 224). As a result of the actual power measurements and the information obtained about the types of devices connected to the ports, the power control process 214 makes a second power allocation among the switch circuits 120 and, via PoE through the network connections over conductors 140, to the other devices connected to the switch ports. The second power allocation may differ from the first (initial) power allocation. If the monitoring process changes the port priorities, then power allocations may be adjusted. Other events, however, such as unplugging an external device, may also trigger re-allocation of power. The power management processes continues to monitor, over the network connections via conductors 140, network traffic and/or to send communications to devices attached to the switch ports to keep abreast of the attached device types, operational statuses, and possibly changing power needs.

The power allocation policy 224 specifies how important a port (Port Importance (PI)) is regarding both its data switching operation and its PoE power allocation. The policy data 224 also includes a port operational priority (POP) parameter, which specifies the relative importance for operation for that port when compared to other switch ports with the same PI value. The policy data 224 also includes a port PoE priority (PPP) parameter, which specifies the relative importance of using this port to deliver PoE relative to other switch ports with the same PI value.

The power control process 214 may perform an initial (first pass) power allocation among the switch ports, via conductors 140, as follows. The power control process 214 initializes a "remaining available power value" to be equal to the amount of power available to the switch (such as the power supplied by the power supply 110, or the sum or the power supplied by the power supply 110 and through the power input control 175). The power control process 214 identifies the set of ports sharing the highest PI value, and determines how much PoE power is requested by this set of ports. If the total power requested for this set of ports can be powered with the remaining available power value, then the power control process 214 grants PoE power to all the ports in this set; otherwise the power control process 214 uses the PPP parameter value of this set of ports as a tie breaker to allocate the remaining power among this set of ports.

If using the PPP value as a tie-breaker still does not enable power to be allocated for all the ports sharing the current PPP value within the remaining power budget, then the process 214 may either: (1) allocate power to no port having the highest PPP value, or (2) use another parameter as a tie breaker to allocate power to a subset of the devices with the highest PPP value. The tie breaker parameter may, for example, be the Port Operational Priority (PoP), port number, a characteristic of the attached station to that port such as MAC address, device type (IP phone, PC, switch, server, net appliance, printer, etc.), or management assigned priority to specific device or device type.

After each PI port set, if any power has been allocated, then the power management agent 200 waits a period of time to allow devices to power up and enter an operational state. If no power has been allocated, the next PI port set is analyzed without delay. Actual power used by the switch circuitry 120 is measured and the remaining power is recalculated.

Figure 3:
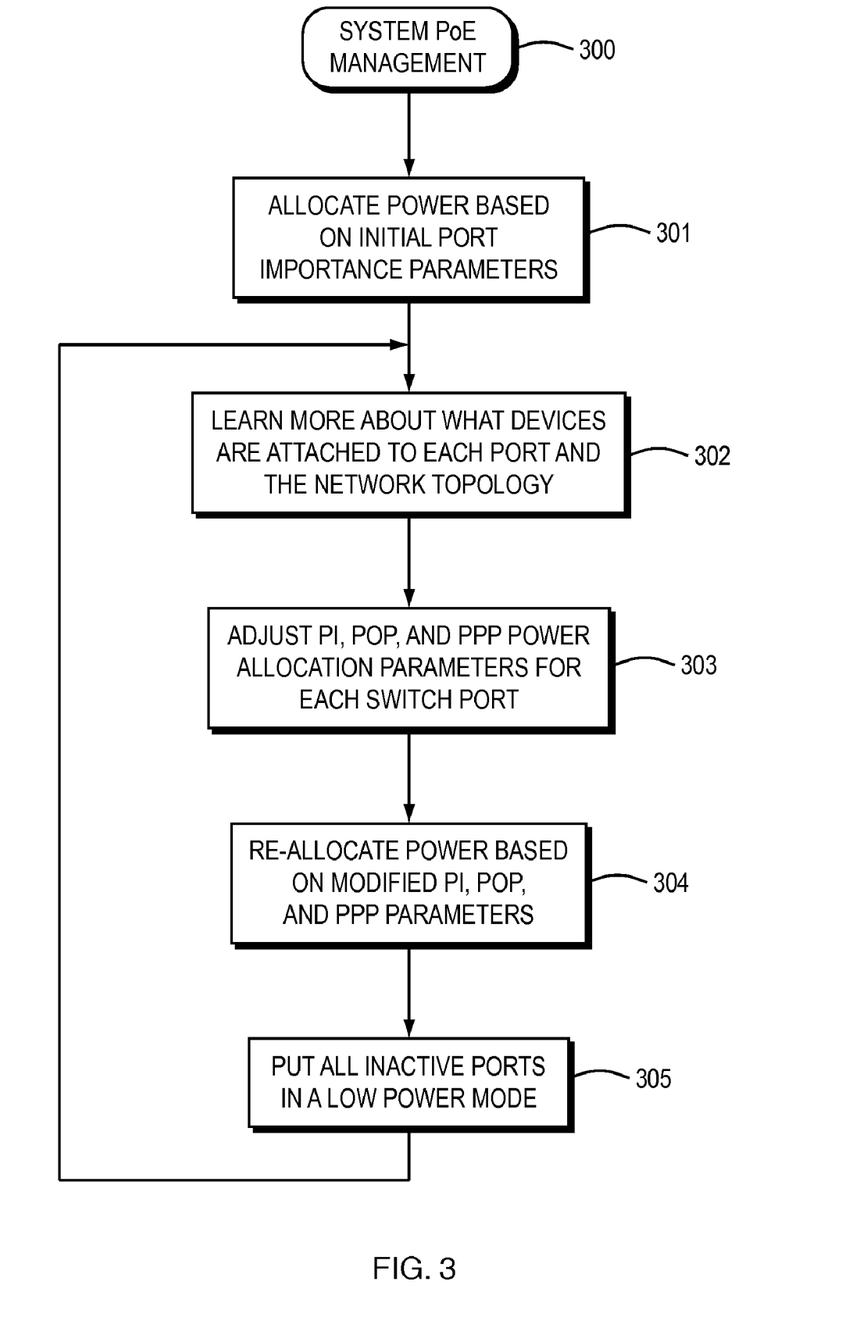
FIG. 3 is a flow chart of a method for performing an initial (first pass) allocation of power according to one embodiment of the present invention.

Referring to FIG. 3, a flowchart is shown of a method for performing a second pass power allocation according to one embodiment of the present invention. After the initial power allocation (301), the power management agent 200 goes into data collection mode trying to glean more information over the network connections via conductors 140 about: (1) the attached device on each of the switch ports and (2) the network topology (302). Examples of information that the method 300 may collect about attached devices include, for example, whether the attached device is an end node and, if so, what type of end node (PC, VoIP phone, Wireless AP, printer, server, etc.); whether the attached device is an intermediate device and, if so, what part of the network topology is connected through that port; and whether the port is a redundant port. The method 300 may use these and/or other information to adjust policy data 224 such as the PI, POP, and PPP power allocation priority parameters assigned to a switch port at step (303).

The newly adjusted power allocation parameters are used for a second pass of power allocation to re-distribute the power allocation based on the more detailed knowledge of the connected devices and the importance of each (304). All inactive ports are put in low power (sleep) mode (305). Such ports can wake up in response to LAN activities from data or PoE signaling. The management agent 200 goes back to monitoring its environment, and after any changes, the power management agent 200 rechecks for power availability and allocation priority.

Figure 4:
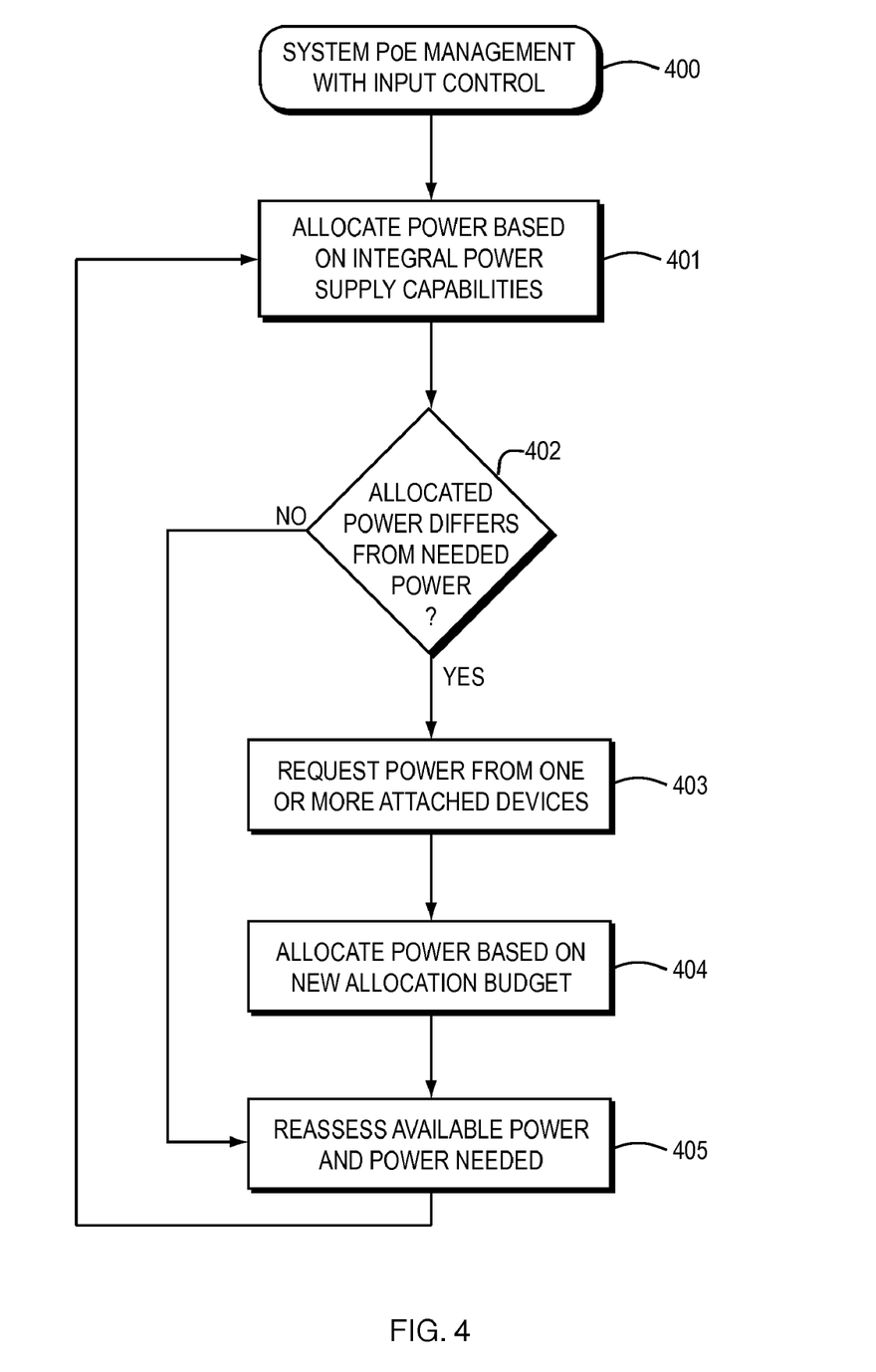
FIG. 4 is a flow chart of a method for performing a second pass allocation of power according to one embodiment of the present invention.

Referring to FIG. 4, a flowchart is shown of a method for utilizing power provided over the network connections via conductors 170 by external devices attached to the ports of switch 100b (FIG. 1B) according to one embodiment of the present invention. If the switch 100b has the capability to receive power from attached devices, and if the integral power supply 110 is insufficient to supply all the power need to power the switch circuits 120 and the PoE-requested power, then the method 400 requests power from attached devices to meet the amount of requested power that can not be supplied by the integral power supply 110. First, the method 400 allocates power to the switching circuits 120 and devices connected through the network connections via conductors 140 based on the output capabilities of the integral power supply 110 (401). Then the method 400 determines whether the currently-allocated power differs from the requested power (402). If all the requests have not been met, then the method 400 requests the power shortfall from one or more devices attached to the switch ports (403). The method 400 then allocates the power received from the attached devices through the network connections via conductors 140 either to the switch ports, the attached devices, or both (404). The method 400 then reassesses the amount of power available and the amount of power needed (405), and then returns to allocating power based on the integral power supply capabilities (401).

Figure 5:
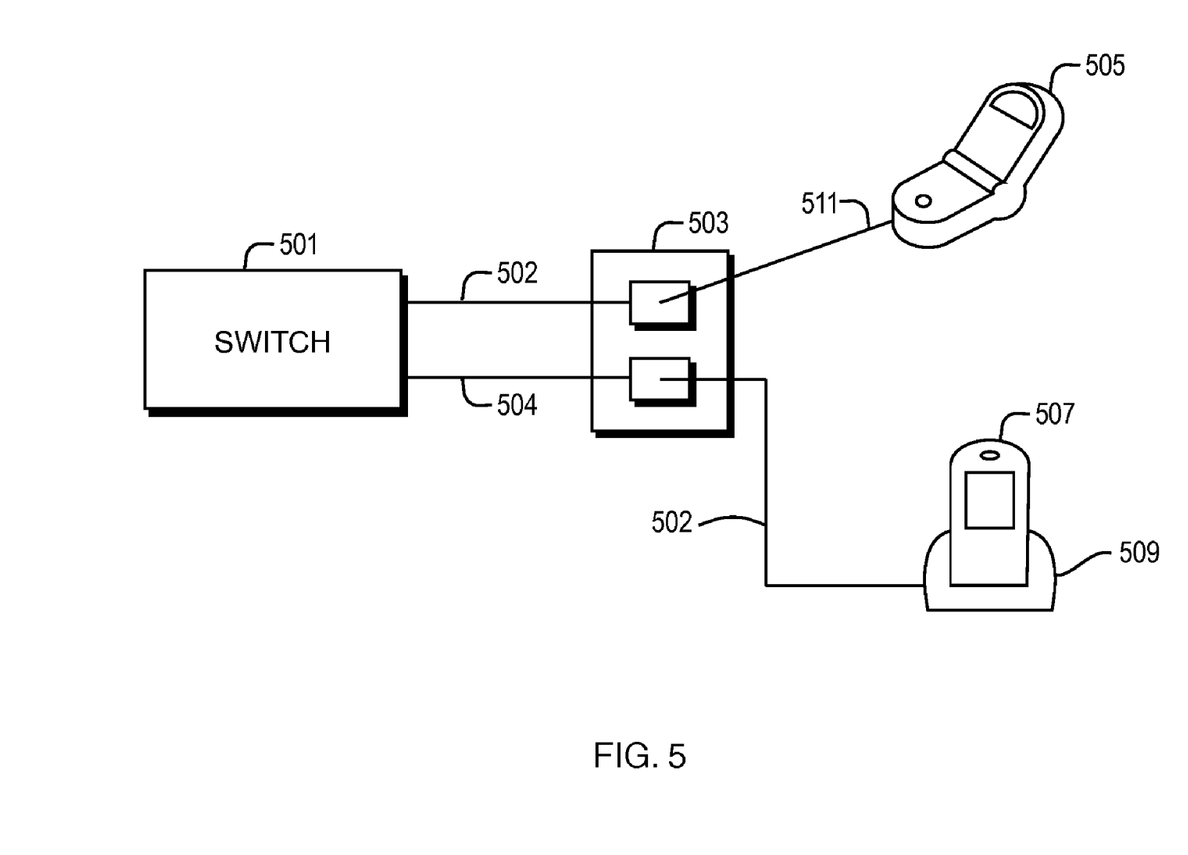
FIG. 5 is a diagram of a switch with PoE power-sourcing equipment capabilities connected to devices that lack integral PoE capabilities, via Ethernet cables according to one embodiment of the present invention.

Referring to FIG. 5, a switch with PoE PSE capabilities 501 is connected to an Ethernet wall jack 503 via Ethernet cables 502 and 504 according to one embodiment of the present invention. A standard Ethernet cable 502 with RJ45 connectors on both ends connects a cell phone charging cradle 509 to the wall jack 503. The cell phone charging cradle 509 is connected to cell phone 507. The connection between the cell phone charging cradle 509 and the cell phone 507 provides power that is provided by the switch 501 and may also provide the Ethernet data connection. The cell phone charging cradle 509 may also provide a DC to DC or AC to DC voltage conversion to convert the voltage provided by the switch 501, for example 48 volts, to a voltage that the cell phone uses to charge its batteries, for example 5 volts.

The cell phone charging cradle 509 may also have circuitry to provide information to the switch 501 indicating the power it is requesting from the switch. This circuitry can vary from a simple implementation that simply indicates that power is needed, for example the IEEE 802.3af discovery step that only requires a 25K resister, to a more complex implementation that requests a lower power than the maximum using, for example, the IEEE 802.3af power classification mechanism. The cell phone charging cradle 509 can request one level of power to initially charge the phone quickly and then later lower its request as the batteries need less power when they are at a higher charged state.

In an alternative implementation a special Ethernet cable 511 could be used to connect directly from the wall jack to the cell phone. This cable 511 may have a miniaturized Ethernet connector to plug into the cell phone due to the small size of today's cell phone. Also the circuitry needed to request power could be placed in the RJ45 connector that plugs into the wall jack. This end is large enough to place a resistor and could also have a small ASIC that either provides the basic discovery function or senses the current draw by the cell phone batteries being charged and, as stated above, lower the power request accordingly.

Embodiments of the present invention have a variety of advantages. For example, the embodiment shown in FIG. 5 has the advantage that the switch may provide power to the charger cradle 509 and/or cell phone over Ethernet cables 502 and 511 even while the cell phones 505 and 507 are turned off or otherwise incapable of sending or receiving Ethernet packets over the Ethernet cables 502 and 511. As a result, the cell phones 505 and 507 may easily be charged by the switch 501 without turning on the cell phones 505 and 507, and without requiring the cell phones 505 and 507 to establish network connections through the switch 501 or to transmit any data. All of the techniques disclosed above may be used to allocate power to the charger cradle 509 and cell phone 505 along with other devices, some of which may be turned on and transmitting Ethernet traffic through the switch.

Although certain prior art systems guarantee power and assign priority of power delivery to a set of ports on a switch, such systems do not trade off power allocated to other components, such as the switching circuits. In contrast, embodiments of the present invention dynamically monitor, assess, and trade off power allocated to the ports and to the switching circuitry in a switch, thereby avoiding the problem of allocating too much power to the switching circuitry and not enough power to the ports, and vice versa. Furthermore, ports may be assigned different priorities so that in the event that available power is insufficient to provide power to all ports, power may be provided to the ports with the highest priorities. Furthermore, power may be obtained from external devices over PoE and then provided to the switching circuitry or to other external devices over PoE.

In the embodiments described above, power budgets for switch operation and PoE are not pre-allocated. As a result, in such embodiments, it is possible for large amounts of power to be allocated to the switching circuits before any power is allocated to PoE, and vice versa. Alternatively, to ensure that both the switching circuits and external devices receive at least some minimum amount of power, a policy may be enforced that allocates some amount of power to switch operation and another amount for delivery of PoE power to other devices. As another example, the above-described algorithms could apply ceilings to the power applied to PoE and to the switching circuitry.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although the switch 100 is illustrated in certain embodiments as including the integral power supply 110, this is merely an example and does not constitute a limitation of the present invention. Alternatively or additionally, one or more external power supplies may perform the same function as the integral power supply 110.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A network switch comprising:
   a plurality of switching circuits;
   at least one port;
   a power management agent;
   and
   a power meter;
   wherein said power management agent is programmed to
      select a first allocation of power to the plurality of switching circuits and the at least one port based on an initial port importance assigned to each of the ports; and
      while supplying power using said first allocation, collecting operating information and using that collected operating information to select a second allocation of power to the plurality of switching circuits and at least one port.

2. The network switch of claim 1, wherein collecting said operating information comprises measuring a first amount of power consumed in aggregate by the plurality of switching circuits.

3. The network switch of claim 1, wherein collecting said operating information comprises measuring a second amount of power consumed in aggregate by the at least one port via Power over Ethernet (PoE).

4. The network switch of claim 1, wherein collecting said operating information comprises identifying characteristics of at least one device connected to the at least one port.

5. The network switch of claim 1, further comprising, if there is insufficient power from a primary power supply to supply all power requests from devices connected to said at least one port, said power management agent requests power from at least one device connected to said at least one port to be supplied to the switch.

6. The network switch of claim 1, wherein said power management agent snoops on packets received by the switch from the at least one device connected to the at least one port for identifying characteristics of that device.

7. The network switch of claim 1, wherein said power management agent is programmed to communicate with the at least one device connected to the at least one port to identify characteristics of that device.

8. The network switch of claim 1, wherein collecting operating information comprises gathering topology information for a network within which the network switch is operating.

9. The network switch of claim 1, wherein if two ports have an equal port importance and power is insufficient to fully supply both, the power management agent is programmed to use a port Power-over-Ethernet (POE) parameter (PPP) as a tie breaker to allocate available power among said two ports.

10. The network switch of claim 9, wherein if two ports having an equal PPP cannot both be fully supplied with power, the power management agent is programmed to use a second parameter as a tie breaker.

11. The network switch of claim 10, wherein the second parameter is any of a Port Operational Parameter (POP), a port number, a type of a device attached to a one of said two ports having an equal PPP, and a management-assigned priority to a specific device or device type.

12. A method for power management in a network switch having a plurality of switching circuits and at least one port, the method comprising:
(A) selecting a first allocation of power to the plurality of switching circuits and the at least one port based on an initial port importance assigned to each of the ports; and
(B) while supplying power using said first allocation, collecting operating information and using that collected operating information to select a second allocation of power to the plurality of switching circuits and at least one port, wherein collecting said operating information comprises:
(B)(1) measuring a first amount of power consumed in aggregate by the plurality of switching circuits;
(B)(2) measuring a second amount of power consumed in aggregate by the at least one port via Power over Ethernet (PoE); and
(B)(3) identifying characteristics of at least one device connected to the at least one port;
wherein said selecting the second allocation of power is based on the first amount of power, the second amount of power, the identified device characteristics, and the at least one modified power management policy.

13. The method of claim 12, further comprising:
(C) before (B), providing power to the plurality of switching circuits and the at least one port in accordance with the first allocation; and
(D) after (B), providing power to the plurality of switching circuits and the at least one port in accordance with the second allocation.

14. The method of claim 13, wherein the second allocation of power requires providing an aggregate amount of power to the at least one port, and wherein (D) comprises:
(D)(1) identifying an amount of power available from an internal power supply of the switch;
(D)(2) if the amount of power available is at least as great as the aggregate amount of power required to be provided to the at least one port, then providing power to the at least one port using power from the internal power supply; and
(D)(3) if the amount of power available is less than the aggregate amount of power required to be provided to the at least one port, then:
(a) requesting power from at least one device connected to the at least one port; (b) receiving power from the at least one device; and
(c) providing power to the at least one port using power from the internal power supply and the received power.

15. The method of claim 12, wherein (B)(3) comprises determining whether the at least one device is an end node.

16. The method of claim 12, wherein (B)(3) comprises identifying a type of the at least one device.

17. The method of claim 12, wherein (B)(3) comprises transmitting a request to the at least one device and receiving a response to the request, the response indicating the characteristics of the at least one device.

18. The method of claim 12, wherein (B)(3) comprises monitoring network traffic transmitted by the at least one device and identifying the characteristics of the at least one device based on the network traffic.

19. The method of claim 12, wherein (B)(3) comprises identifying a location of the at least one device in a network topology.

20. The method of claim 12, further comprising:
(A) providing power to the plurality of switching circuits and the at least one port in accordance with the first allocation.

21. The method of claim 12, further comprising modifying, based on the identified device characteristics, at least one power management policy for allocating power among the at least one port to produce at least one modified power management policy; wherein the at least one power management policy comprises port priorities associated with the at least one port.

22. The method of claim 12, further comprising increasing a port importance value of one of the at least one port if the port provides network access for an important device connected to the one of the at least one port.

23. The method of claim 12, further comprising increasing a port importance value of one of the at least one port if the port provides network access for an important part of a topology of a network to which the switch is connected.

24. A method for power management in a network switch having a plurality of switching circuits and at least one port, the method comprising:
selecting a first allocation of power to the plurality of switching circuits and the at least one port based on an initial port importance assigned to each of the ports;
while supplying power using said first allocation, collecting operating information; and selecting a second allocation of power to the plurality of switching circuits and at least one port, said second allocation being based on the collected operating information.

25. The method of claim 24, wherein collecting said operating information comprises measuring a first amount of power consumed in aggregate by the plurality of switching circuits.

26. The method of claim 24, wherein collecting said operating information comprises measuring a second amount of power consumed in aggregate by the at least one port via Power over Ethernet (PoE).

27. The method of claim 24, wherein collecting said operating information comprises identifying characteristics of at least one device connected to the at least one port.

28. The method of claim 24, further comprising, if there is insufficient power from a primary power supply to supply all power requests from devices connected to said at least one port, requesting power from the devices connected to said at least one port to be supplied to the switch.

29. The method of claim 27, wherein identifying characteristics of at least one device connected to the at least one port comprises snooping on packets received by the switch from the at least one device connected to the at least one port.

30. The method of claim 27, wherein identifying characteristics of at least one device connected to the at least one port comprises communicating with the at least one device connected to the at least one port.

31. The method of claim 27, wherein collecting operating information comprises gathering topology information for a network within which the network switch is operating.

32. The method of claim 24, wherein if two ports have an equal port importance and power is insufficient to fully supply both, the method further comprises using a port Power-over-Ethernet (POE) parameter (PPP) as a tie breaker to allocate available power among said two ports.

33. The method of claim 32, wherein if two ports having an equal PPP cannot both be fully supplied with power, the method further comprises using a second parameter as a tie breaker.

34. The method of claim 33, wherein the second parameter is any of a Port Operational Parameter (POP), a port number, a type of a device attached to a one of said two ports having an equal PPP, and a management-assigned priority to a specific device or device type.

* * * * *